United States Patent
Dolazza et al.

[11] Patent Number: 5,740,805
[45] Date of Patent: Apr. 21, 1998

[54] ULTRASOUND BEAM SOFTENING COMPENSATION SYSTEM

[75] Inventors: Enrico Dolazza, Boston; William Wong, Milton, both of Mass.

[73] Assignee: Analogic Corporation, Peabody, Mass.

[21] Appl. No.: 752,719

[22] Filed: Nov. 19, 1996

[51] Int. Cl.[6] ........................................ A61B 8/00
[52] U.S. Cl. ........................ 128/660.06; 128/660.07
[58] Field of Search ................. 128/661.09, 661.01, 128/660.06, 660.07

[56] References Cited

U.S. PATENT DOCUMENTS

| | | | |
|---|---|---|---|
| 4,542,657 | 9/1985 | Barber et al. | 128/661.09 |
| 4,669,314 | 6/1987 | Magrane | 73/610 |
| 4,920,521 | 4/1990 | Yoshie | 367/103 |
| 5,121,364 | 6/1992 | O'Donnell | 128/660.06 |
| 5,218,869 | 6/1993 | Pummer | 128/660.06 |
| 5,301,674 | 4/1994 | Erikson et al. | 128/661.01 |
| 5,549,111 | 8/1996 | Wright et al. | 128/661.01 |
| B1 4,016,750 | 5/1984 | Green | 73/629 |

*Primary Examiner*—Francis Jaworski
*Attorney, Agent, or Firm*—Lappin & Kusmer LLP

[57] ABSTRACT

The disclosed ultrasound system processes ultrasound signals having centroid frequencies that decrease as a function of time. The system includes transducers for receiving the ultrasound signals and generating electrical signals representative thereof. The system further includes data samplers for sampling the electrical signals with a sampling frequency. A controller controls the sampling frequency so that it decreases according to a function of time and the centroid frequency.

18 Claims, 5 Drawing Sheets

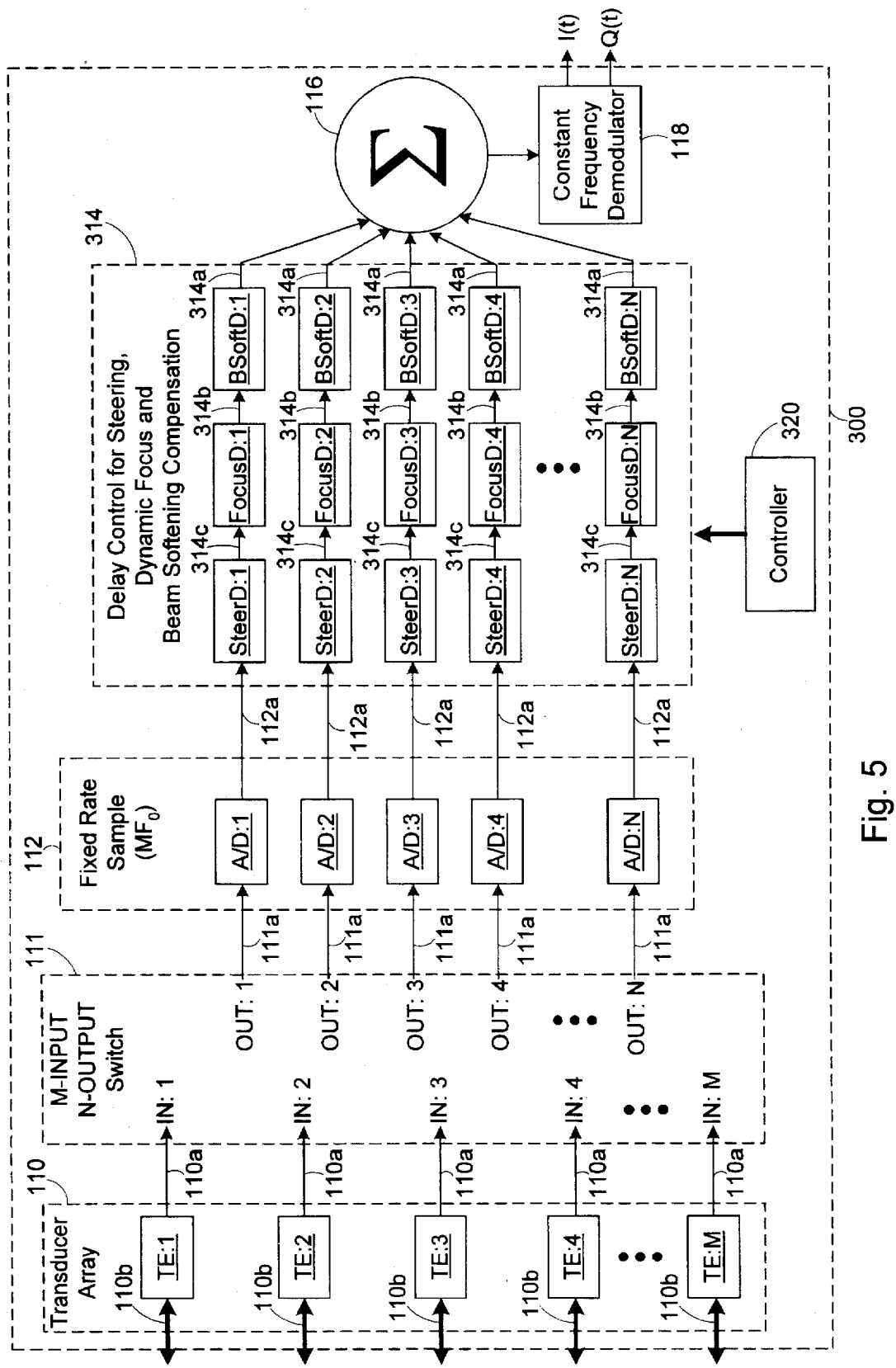

ULTRASOUND BEAM SOFTENING COMPENSATION SYSTEM

FIELD OF THE INVENTION

The present invention relates generally to ultrasound systems for performing medical diagnostic examinations of human patients and other subjects. More particularly, the invention relates to an improved beam softening compensation system for use with ultrasound systems. The beam softening compensation system provides compensation for frequency dependent attenuation of ultrasound signals caused by propagation through a body.

BACKGROUND OF THE INVENTION

Pulsed ultrasound systems used to examine, for example, a human body, typically use one or more transducer elements to emit a signal comprising a series of ultrasound pulses. Each pulse is steered so that it propagates in a selected direction into the body, and as a pulse propagates, portions of the energy in the pulse are reflected by various internal structures of the body through which the pulse propagates. The transducers receive these reflections, which are commonly referred to as echoes, and the ultrasound system then processes the echoes to generate a visual, and/or audio, display representative of the body's internal structures from which the echoes were received.

FIG. 1 is a block diagram of a portion of the signal processing section of a prior art, N-channel, phased array, pulsed ultrasound system 100 where N is a whole integer. System 100 includes an M-channel array 110 of transducer elements, an M-input N-output switch or multiplexor 111 (M being a whole integer and greater than N), an N-channel array 112 of analog-to-digital converters, an N-channel digital delay line 114, a digital summer 116, a digital demodulator 118, and a controller 120. The array 110 includes M transducer elements TE:1–TE:M, and the array 112 includes N analog-to-digital converters A/D:1–A/D:N. Delay line 114 includes N steering delay modules SteerD:1–SteerD:N, and N focusing delay modules FocusD:1–FocusD:N. N is often a number on the order of sixty-four or one hundred and twenty-eight.

In operation, the array 110 of transducer elements may first generate and then receive ultrasound signals, the ultrasound signals being indicated generally at 110b. Array 110 normally generates a sequence of ultrasound pulses that propagate into the body of a patient (not shown), each of the pulses having a spectral distribution centered around a frequency $F_0$, where $F_0$ is commonly referred to as the center frequency. During the time intervals between the pulses, array 110 receives the echoes generated in response to the most recent pulse. The time interval during which system 100 receives all the echoes from a single emitted ultrasound pulse is referred to herein as a "receive interval". System 100 processes the echoes received during each receive interval to generate digital versions of the familiar "In-phase" signals (shown in FIG. 1 as "I(t)") and "Quadrature" signals (shown in FIG. 1 as "Q(t)").

Upon reception of an ultrasound echo 110b, the transducer elements TE:1–TE:M generate a group of M analog electrical signals representative of the echo, and these electrical signals are applied via lines 110a to the input terminals of the M-input N-output switch 111. At any given moment in time, switch 111 applies via lines 111a the electrical signals generated by N of the transducer elements (i.e., TE:K–TE:[K+N]) to respective ones of the analog-to-digital converters A/D:1–A/D:N. The latter sample the N electrical signals using a sampling frequency $F_S$ to generate a set of N corresponding digital signals, and the sampling frequency $F_S$ is normally greater than twice the highest frequency component of the received echo to satisfy the Nyquist criteria. The N digital signals are applied via lines 112a to respective ones of the steering delay modules SteerD:1–SteerD:N. Each of the steering delay modules SteerD:1–SteerD:N generates an output signal that is a delayed version of its input signal, and these output signals are applied via lines 114b to respective ones of the focusing delay modules FocusD:1–FocusD:N. Each of the latter generates an output signal that is a delayed version of its input signal, and these output signals are applied via lines 114a to summer 116. Summer 116 generates an output signal representative of the sum of all the signals on lines 114a and applies this summed signal to digital demodulator 118 which in turn generates the In-phase and Quadrature signals. Controller 120 is coupled to a control input of delay line 114 and thereby independently controls the lengths of the delays provided by each of the steering and focusing delay modules. Controller 120 also controls switch 111 in known fashion so that over time system 100 processes the signals generated by all M of the transducers in array 110.

As is well known, controller 120 may selectively define a "reception angle" so that system 100 generates the In-phase and Quadrature signals representative only of the echoes that intersect transducer array 110 from a direction at or near the reception angle, and thus is representative of an ultrasound image at that angle. Controller 120 controls the reception angle by adjusting the relative lengths of the delays provided by the steering delay modules SteerD:1–SteerD:N, and these delays are therefore referred to as "steering delays". Further, controller 120 selectively allows system 100 to focus the ultrasound image at different depths within the body of a patient (and thereby controls the focus of the received beam while the echoes are received) by dynamically adjusting the lengths of the delays relative to the time the original pulse is transmitted, by adjusting the delays provided by the focusing delay modules FocusD:1–FocusD:N, and these delays are therefore referred to as "focusing delays".

In operation, system 100 generates each ultrasound pulse so that it propagates into the body at a selected "transmission angle" (the transmission angle being measured with respect to the surface of transducer array 110 from which the ultrasound pulse propagates into the body, so that ultrasound pulses generated from the transducers of the array at the same time in a direction perpendicular to the surface of a flat array, for example, will be transmitted at a transmission angle of 90°). System 100 typically varies the transmission angle from pulse to pulse over a predetermined number of pulse intervals (by varying the relative delays of when a pulse is transmitted from each transducer) allowing system 100 to "sweep" through a wide angle and thereby scan a large portion of a patient. Once a transmission angle is selected for a particular pulse of a pulse interval, controller 120 adjusts the steering delays to select a reception angle that matches the transmission angle. Controller 120 maintains the reception angle constant until the transmission angle is varied for a new transmitted pulse. Although the steering delays may be varied from pulse to pulse (if the transmission angle is varied from pulse to pulse), the steering delays are referred to as "constant delays" since they remain constant during an entire receive interval (where, as stated above, a receive interval is defined as the period during which all echoes are received from a single emitted ultrasound pulse).

At the beginning of a receive interval, controller 120 adjusts the focussing delays so that system 100 focuses at a relatively shallow depth within the patient's body, and as time evolves, controller 120 dynamically adjusts the focusing delays so that system 100 focuses at ever increasing depths. Since controller 120 dynamically adjusts the focusing delays during a single receive interval, these delays are referred to as "dynamic delays".

As is well known, in typical ultrasound applications delay line 114 must generate delayed samples on lines 114a having a temporal resolution as fine as a few nanoseconds (e.g., 6 ns) for system 100 to provide desired steering and focusing control. However, the maximum sampling frequency of the analog-to-digital converters normally used in ultrasound systems is only about a few tens of megahertz (e.g., 40 MHz) so the samples on lines 112a generated by array 112 are typically spaced apart by about a few tens of nanoseconds. More specifically, when the sampling frequency of the analog-to-digital converters is 40 MHz, the samples generated by array 112 are spaced apart by 25 ns, and this spacing is too coarse for providing proper steering and focusing control. One well known method for gaining the extra temporal resolution required for proper steering and focusing control is to add interpolation circuitry (not shown) to delay line 114 for interpolating between two or more samples of the input signals on lines 112a (which, for example, may be spaced apart by 25 ns) so that delay line 114 can generate output signals on lines 114a having finer temporal resolution (i.e., so that the samples of the output signals on lines 114a are spaced apart by as little as, for example, 6 ns). Another well known method of gaining the extra temporal resolution is to vary the sampling phase used by the analog-to-digital converter array 112. Although not explicitly shown in FIG. 1, those skilled in the art will appreciate that prior art system 100 includes either interpolation circuitry in delay line 114 or devices for varying the sampling phase of converter array 112 for increasing the temporal resolution of the sampled signals on lines 114a that are applied to summer 116.

Summer 116 generates an output signal representative of the sum of all the delayed samples on lines 114a generated by delay line 114 at each particular time interval. When delay line 114 provides appropriate delays, and when system 100 provides appropriate control of switch 111, this summed output signal is representative of an echo generated at a single point within the patient's body at a particular measuring interval as measured by all the transducer elements of array 110.

The summed output signal generated by summer 116 is then applied to digital demodulator 118 which demodulates the signal and thereby generates the In-phase and Quadrature signals. Demodulator 118 includes two multipliers 130, 132 and, in the most general case, two appropriate filters 134, 136 (e.g., low pass filters). The output signal generated by summer 116 is applied to an input of both multipliers 130, 132. A digital cosine waveform oscillating at the center frequency of the transmitted pulse (i.e., $\cos 2\pi n[F_0/F_S]$, where, as is well known, the variable n is a discrete variable representative of time intervals) is applied to the other input of multiplier 130, and a digital sine waveform oscillating at the center frequency of the transmitted pulse (i.e., $\sin 2\pi n [F_0/F_S]$) is applied to the other input of multiplier 132. As is well known, multiplying the summed outpro signal by the cosine and sine waveforms both "downshifts" (in frequency) and "upshifts" (in frequency) the summed output signal thereby generating output signals that include both baseband and high frequency components. This downshifting and upshifting may be understood in terms of the well known formula for the product of two cosine signals shown in the following Equation (1).

$$\cos(a)\cos(b) = \tfrac{1}{2}\cos(a-b) + \tfrac{1}{2}\cos(a+b) \quad (1)$$

In Equation (1), the cos(a−b) term represents the "downshifted" or baseband component, and the cos(a+b) term represents the "upshifted" or high frequency (or double frequency) component.

The output signals generated by multipliers 130, 132 are applied to and are filtered by low pass filters 134, 136, respectively, which filter out the high frequency components and pass the baseband components. The filters 134 and 136 thereby generate the In-phase and Quadrature signals, respectively.

As is well known, ultrasound signals are increasingly attenuated, according to a function of distance, as they propagate through a body. Therefore, echoes received from shallow structures are generally less attenuated than echos received from structures located deeper within the body. Ultrasound systems normally compensate for this attenuation by amplifying the received echo signals with a variable gain amplifier having a gain that is reset to a nominal value at the beginning of every receive interval and then increases as a function of time during each receive interval. This form of compensation is commonly referred to as "time gain control" and may be implemented, for example, in system 100 as a set of N analog, variable gain amplifiers disposed for amplifying the signals on lines 110a and having gains that are controlled by controller 120. However, time gain control only partially compensates for the effects of ultrasound signal attenuation.

The attenuation experienced by ultrasound signals due to propagation through the body is not uniform for all frequencies, rather, the ultrasound signals are increasingly attenuated with increasing frequency. FIG. 2A shows a simplified illustration of the frequency spectrum of a typical transmitted ultrasound pulse having a center frequency $F_0$. FIGS. 2B–D show simplified illustrations of the frequency spectrums of three echos generated in response to the transmitted pulse at the beginning, middle, and end, respectively, of a single receive interval. The echos shown in FIGS. 2B–D are generated by body structures located at relatively shallow, medium, and relatively deep depths, respectively. As shown in FIG. 2B, the spectrum of echoes received at the beginning of a receive interval, which are generated by relatively shallow body structures, closely resembles the spectrum of the transmitted pulse. However, as shown in FIG. 2D, the spectrum of the echoes received at the end of a receive interval, which are reflected by relatively deep body structures, is significantly different. The spectrum of the later received echoes is narrower than that of the transmitted pulse, and, more importantly, the later received echos have a center, or centroid, frequency that is lower than $F_0$ since the higher frequency components of these echos have been increasingly attenuated. The term "centroid frequency" as used herein shall preferably mean the frequency at which an equal amount of signal energy (the signal energy being represented by the area under the curve shown in each of the FIGS. 2A–2D) above and below that frequency, although it should be appreciated that other criteria can be used to determine the "centroid frequency". This phenomenon, of a decreasing centroid frequency over time is generally known as "beam softening" and has implications for optimal processing and demodulation of the received echoes. Ideally, ultrasound systems should provide time gain control as well as some form of beam softening compensation to compensate for the attenuation experienced by ultrasound signals as they propagate through a body.

Prior art system 100 (shown in FIG. 1) is disadvantageous in that it does not provide any form of beam softening compensation. The In-phase and Quadrature signals generated by demodulator 118 are baseband signals and, ideally, the energy spectrum of these signals should be centered about zero Hertz. Since the echos received at the beginning of a receive interval have a centroid frequency equal to (or very close to) $F_0$ and since alemodulator 118 uses cosine and sine signals oscillating at a frequency of $F_0$ to downshift the echos, the baseband versions of these echos are centered about zero Hertz. However, since the echos received later in a receive interval have a centroid frequency that is less than $F_0$, multiplication of these signals by cosine and sine signals oscillating at a frequency of $F_0$ downshifts these signals in frequency by too much so that the baseband versions of the later received echo signals are not centered about zero Hertz. Therefore, beam softening prevents system 100 from generating optimal versions of the In-phase and Quadrature signals for the later received echos.

U.S. Pat. No. 4,016,750 (and Reexamination Certificate B1 4,016,750) issued to Green and assigned to Stanford Research Institute ("SRI") describes a well known approach to beam softening compensation. The SRI approach uses a variable bandpass filter (or "sliding" bandpass filter) to filter the received echo signals. The passband of the filter is adjusted according to a function of time so that the passband always surrounds the spectrum of the received echo signals.

Although such a system provides effective compensation for beam softening, the implementation of a sliding bandpass filter is inconvenient and there remains a need for other types of ultrasound systems which provide improved forms of compensation for ultrasound beam softening.

OBJECTS OF THE INVENTION

It is an object of the present invention to substantially reduce or overcome the above-identified problems of the prior art.

Another object of the present invention is to provide an improved ultrasound system that provides beam softening compensation without using a sliding band pass filter.

Still another object of the present invention is to provide an improved ultrasound system that provides beam softening compensation by sampling the echo signals with a variable sampling frequency that decreases according to a function of time.

Yet another object of the present invention is to provide an improved ultrasound system that samples the echo signals with a constant frequency and then delays the samples using varying amounts of delay to generate delayed samples at a variable frequency that decreases according to a function of time.

And another object of the present invention is to provide an improved ultrasound system that provides beam softening compensation by sampling the echo signals with a variable sampling frequency that decreases according to a function of time in a fashion that is complementary to the decrease of the centroid frequency of the echo signal.

Still another object of the present invention is provide an improved ultrasound system that provides beam softening compensation by sampling the echo signals with a variable frequency and then demodulates the samples using a constant frequency demodulator.

SUMMARY OF THE INVENTION

These and other objects are provided by an improved ultrasound system that samples the echo signals using a variable sampling frequency that decreases according to a function of time and then demodulates the sampled signals using a constant frequency demodulator.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE DRAWINGS

For a fuller understanding of the nature and objects of the present invention, reference should be had to the following detailed description taken in connection with the accompanying drawings in which the same reference numerals are used to indicate the same or similar parts wherein:

FIG. 5 shows a block diagram of a portion of the signal processing section of a preferred N-channel, phased array, pulsed ultrasound system constructed according to the invention to provide beam softening compensation.

DETAILED DESCRIPTION OF THE DRAWINGS

Figure 1:
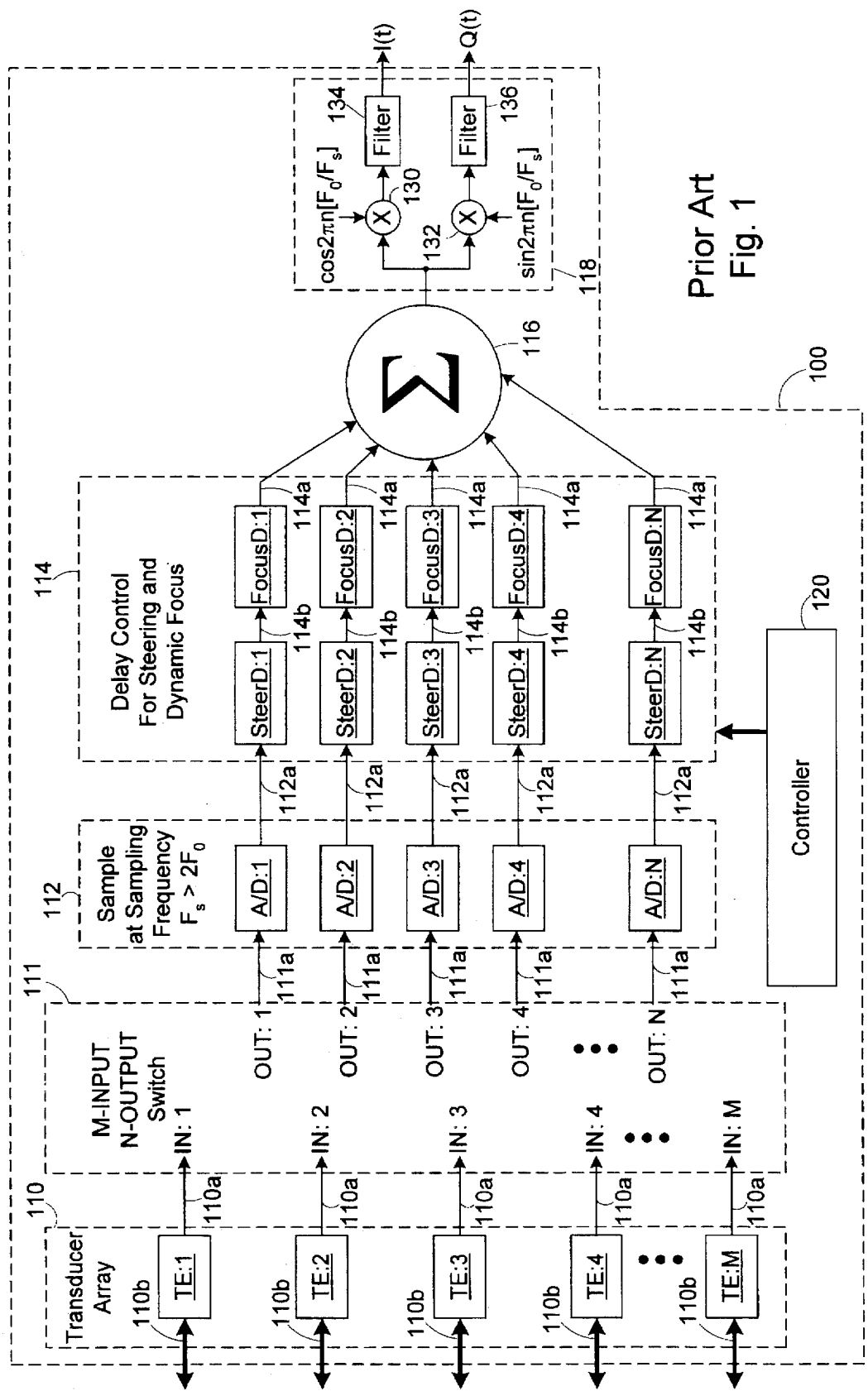
FIG. 1 shows a block diagram of a portion of the signal processing section of a prior art N-channel, phased array, pulsed ultrasound system.
Figure 3:
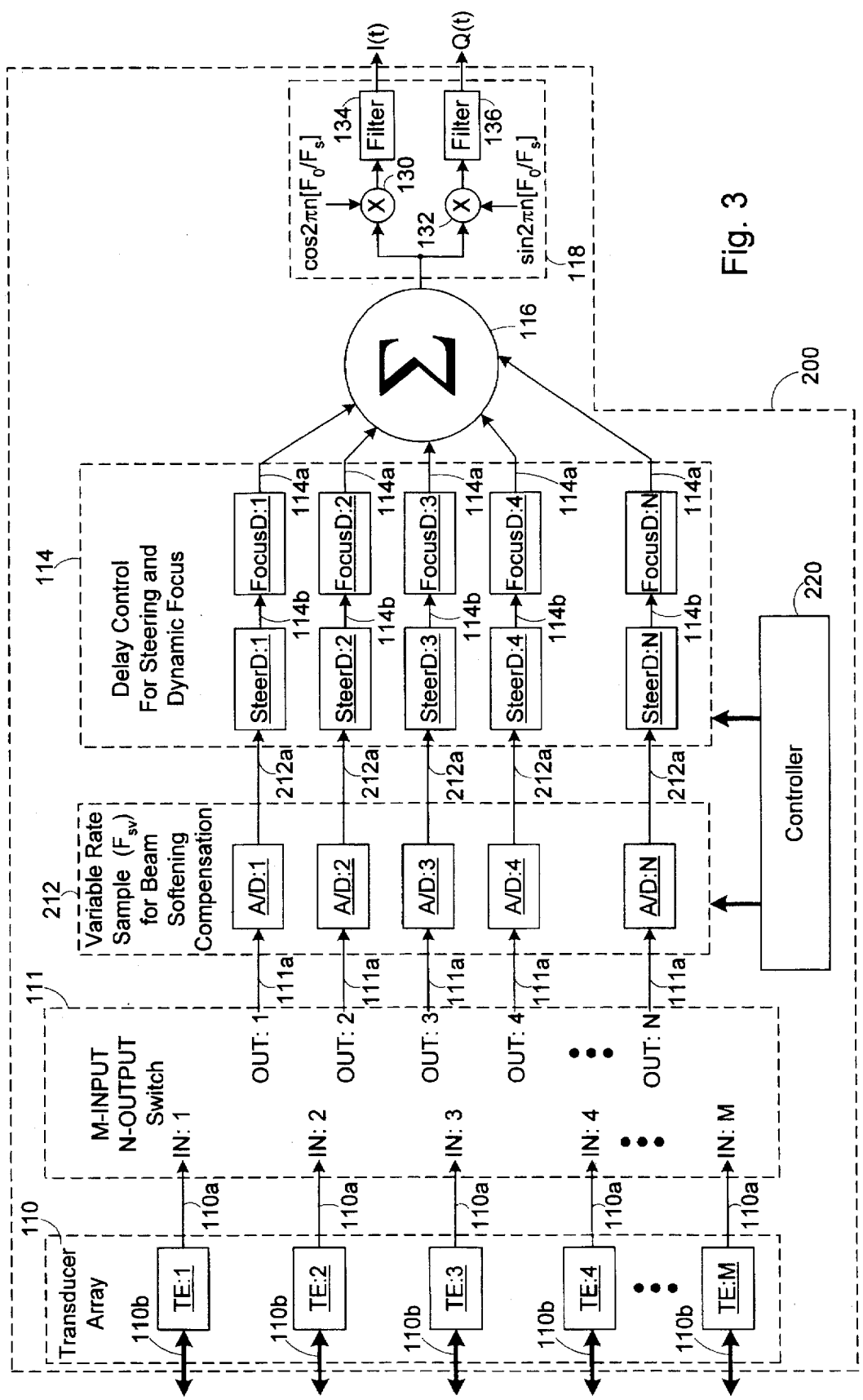
FIG. 3 shows a block diagram of a portion of the signal processing section of an N-channel, phased array, pulsed ultrasound system constructed according to the invention to provide beam softening compensation.

FIG. 3 shows a block diagram of a portion of the signal processing section of an N-channel, phased array, pulsed ultrasound system 200 constructed according to the invention so as to provide an improved form of ultrasound beam softening compensation. System 200 is similar to prior art system 100 (shown in FIG. 1), however, rather than array 112, system 200 includes an array 212 of analog-to-digital converters that samples the electrical signals generated by transducer array 110 using a variable sampling frequency $F_{SV}$. Further, system 200 includes a controller 220 that in addition to controlling the steering and focusing delays provided by delay line 114 also controls the variable sampling frequency $F_{SV}$ used by converter array 212. Controller 220 preferably sets the sampling frequency $F_{SV}$ to an initial value at the beginning of every receive interval and then decreases the sampling frequency as a function of time thereafter. As will be discussed further below, the combination of sampling the echos with a variable sampling frequency $F_{SV}$ and then demodulating the echos with constant frequency demodulator 118 provides an optimal form of beam softening compensation and results in generating In-phase and Quadrature signals that are centered about zero Hertz or very close to zero Hertz.

Figure 4:
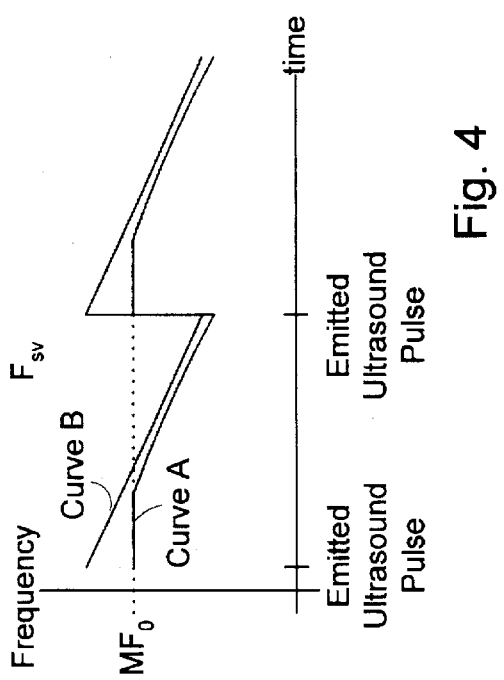
FIG. 4 shows a graph of frequency versus time illustrating two preferred choices for the variable sampling frequency used by the analog-to-digital converters in the system shown in FIG. 3.
Figure 2A:
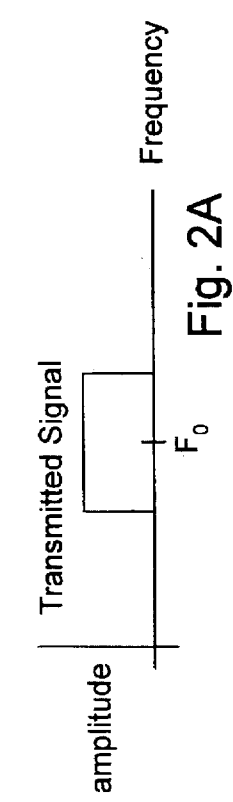
FIG. 2A shows a graph of amplitude versus frequency illustrating the spectral content of an ultrasound pulse transmitted by a pulsed ultrasound system.
Figure 2B:
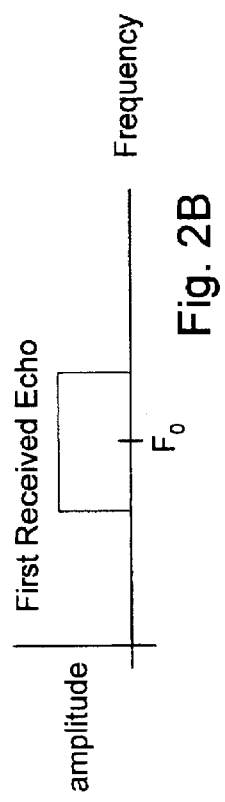
FIGS. 2B, 2C, and 2D show graphs of amplitude versus frequency illustrating the spectral content of three echos received by an ultrasound system at the beginning, middle, and end, respectively, of a receive interval.
Figure 2C:
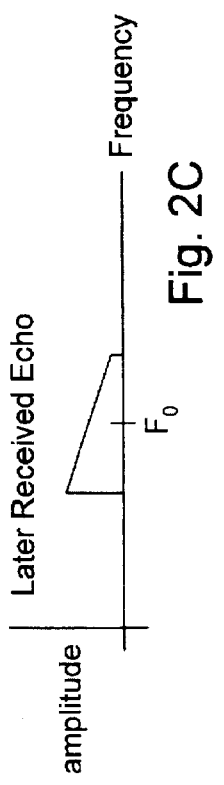
Figure 2D:
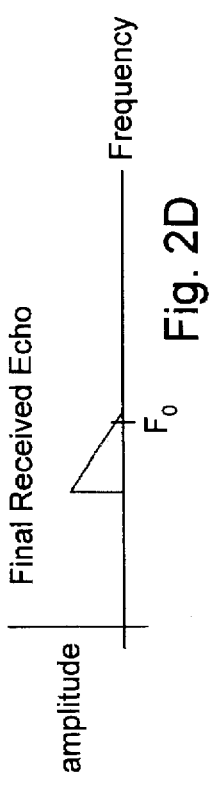

FIG. 4 shows a graph of frequency versus time illustrating two possible choices for the variable sampling frequency $F_{SV}$ used by converter array 212. Two curves, Curve A and Curve B, are illustrated in FIG. 4, and both curves represent preferred choices for the variable sampling frequency $F_{SV}$ for two receive intervals. If Curve A is used, controller 200 initially sets the variable sampling frequency $F_{SV}$ at the beginning of a receive interval to $KF_0$ where K is a constant greater than two and $F_0$ is the center frequency of the transmitted pulse. As time evolves during the receive interval, controller 220 maintains the sampling frequency $F_{SV}$ at $KF_0$, and then gradually decreases the sampling frequency in a complementary fashion to the decrease of the centroid frequency of the received echos caused by the increased attenuation of higher frequency portions of the ultrasound signals. If Curve B is used, controller 220 initially sets the sampling frequency $F_{SV}$ slightly greater than $KF_0$ at the beginning of each receive interval and then gradually decreases the sampling frequency throughout each receive interval. One preferred choice for Curve B is to initially set the sampling frequency $F_{SV}$ equal to $(1.1)KF_0$ at the beginning of a receive interval and to continuously decrease $F_{SV}$ so that it is equal to $(0.7)KF_0$ at the end of the receive interval. In one preferred embodiment, the constant K is chosen to be equal to the integer four.

Curve B of FIG. 4 may offer improved performance over Curve A. When Curve B is used, the sampling frequency $F_{SV}$ is initially greater than $KF_0$ and this in combination with demodulation by constant frequency demodulator 118 of FIG. 3 effectively discards some of the lower frequency energy from the In-phase and Quadrature signals generated early in the receive interval. Discarding a portion of the low frequency energy in this fashion has the effect of "sharpening" or enhancing these signals. Further, since the power of the echos decreases as time evolves during a receive interval, discarding some of the energy from the In-phase and Quadrature signals in the early portion of a receive interval has the effect of partially equalizing the power of the In-phase and Quadrature signals when viewed over an entire receive interval.

As is well known, in a digital demodulator such as demodulator 118 (shown in FIG. 3), the number of samples of the sine and cosine waves (which are applied to multipliers 130 and 132, respectively) used during each period of oscillation is normally matched to the sampling frequency used by the analog-to-digital converter array. However, in system 200, converter army 212 uses a variable sampling frequency $F_{SV}$, and demodulator 118 treats the samples as if they were sampled by a constant sampling frequency $F_S$. As stated above, the variable sampling frequency $F_{SV}$ used by converter array 212 is preferably equal to, or nearly equal to, $KF_0$ at the beginning of a receive interval (where K is a constant greater than two and is preferably equal to the integer four). Demodulator 118 preferably uses a constant sampling frequency of $KF_0$ so that the cosine and sine waveforms applied to multipliers 130, 132 are equal to $\cos(2\pi n/K)$ and $\sin(2\pi n/K)$, respectively. The integer four is a preferred choice for the constant K because, as is well known, the samples of the cosine waveform $\cos(2\pi n/4)$ are given by the sequence (1, 0, −1, 0) and the samples of the sine waveform $\sin(2\pi n/4)$ are given by the waveform (0, 1, 0, −1). So when K is equal to four, the multipliers 130, 132 in demodulator 118 need not be general purpose multipliers and instead may be implemented by relatively simple devices that are only capable of multiplying by zero, one, and minus one. Setting K equal to four is also preferred since this provides sufficient oversampling of the echo signal.

In system 200, although the sampling frequency $F_{SV}$ used by converter array 212 is initially equal or close to $KF_0$ and then decreases thereafter (as shown in FIG. 4), demodulator 118 of FIG. 3 always uses K samples of the cosine and sine waveforms during each period of their oscillation. System 200 therefore provides a constant frequency demodulation of the echo signal that was sampled using a variable frequency. The results of sampling the echo signal with a variable sampling frequency followed by constant frequency demodulation may be understood in terms of Equation (1). If the cos(a) term is allowed to represent the cosine waveform of the constant frequency demodulator, and if the cos(b) term is allowed to represent a component of the echo signal oscillating at the centroid frequency, then the terms 'a' and 'b' are described by the formulas shown in Equation (2)

$$a = \frac{2\pi n F_0}{F_S} \quad b = \frac{2\pi n F_C}{F_{SV}} \qquad (2)$$

in which $F_C$ is equal to the centroid frequency of the echo signal which as previously described in connection with FIGS. 2A–2D varies over the time of the receive interval. A component of the echo signal oscillating at the centroid frequency is downshifted to exactly zero Hertz when the term 'a−b' of Equation (1) is equal to zero, or in other words, when 'a' equals 'b'. Setting 'a' equal to 'b' and solving for the variable sampling frequency $F_{SV}$ yields the formula shown in Equation (3)

$$F_{SV} = \frac{F_C F_S}{F_0} = KF_C \qquad (3)$$

which describes the variable sampling frequency in terms of the centroid frequency of the echo signal. Since the centroid frequency $F_C$ decreases as a function of time, optimally demodulated signals are generated by decreasing the variable sampling frequency $F_{SV}$ in a complementary fashion.

Although not shown explicitly in FIG. 3, those skilled in the art will appreciate that system 200 includes (as does prior art system 100) devices for increasing the temporal resolution of the delayed samples applied to summer 116 via lines 114a, and such devices may be implemented as interpolation circuitry in delay line 114 for interpolating between samples, or alternatively as devices for varying the sampling frequency $F_{SV}$ used by converter array 212. In the case of devices for varying the sampling frequency $F_{SV}$, such devices vary the sampling frequency $F_{SV}$ by an amount that is in addition to the amount introduced by controller 220 to provide the beam softening compensation. Further, although not shown in FIG. 3, those skilled in the art will appreciate that system 200 further includes devices for implementing some form of time gain control.

FIG. 5 is a block diagram of a portion of the signal processing section of a preferred embodiment of an N-channel, phased array, pulsed ultrasound system 300 constructed according to the invention so as to provide an improved form of ultrasound beam softening compensation. System 300 is similar to system 200 (shown in FIG. 3) however, system 300 uses a different delay line 314 and a different controller 320. Further, system 300 uses converter array 112 which samples the electrical signals generated by transducer array 110 using a fixed sampling rate, and therefore, controller 320 need not control the sampling rate used by converter array 112.

In addition to including N steering delay modules SteerD:1–SteerD:N, and N focus delay modules FocusD:1–FocusD:N, delay line 314 additionally includes N beam softening delay modules BSoftD:1–BSoftD:N. The output signals generated by the steering delay modules SteerD:1–SteerD:N are applied via lines 314c to respective ones of the focus delay modules FocusD:1–FocusD:N and the output signals generated by the latter are applied via lines 314b to respective ones of the beam softening delay modules BSoftD:1–BSoftD:N. All of the output signals generated by the beam softening delay modules BSoftD:1–BSoftD:N are applied to summer 116 via lines 314a. In addition to the steering and focussing delays, controller 320 independently adjusts the lengths of the delays, referred to as the "beam softening delays", provided by the beam softening delay modules BSoftD:1–BSoftD:N.

In operation, controller 320 adjusts the beam softening delays so that the samples generated on lines 314a appear with a frequency that is equal to the variable sampling frequency $F_{SV}$ used by converter array 212 (shown in FIG. 3) of system 200. Rather than use a variable sampling frequency in the analog-to-digital converter array, system 300 uses a constant sampling frequency in the analog-to-digital converter array and achieves the effect of a variable sampling frequency by adding extra delays (i.e., the beam softening delays) to delay line 314 which increase over time during the receive interval so as to effectively achieve the equivalent of a variable sampling frequency. The beam softening delays are dynamic delays since controller 320 varies the lengths of the delays dynamically during a single receive interval. Those skilled in the art will appreciate that the overall functionality of system 300 is equivalent to that of system 200 and that in general, a variable frequency data sampler is equivalent to a constant frequency data sampler followed by a delay line that provides an appropriately varying amount of delay.

System 300 is preferred over system 200 because many prior art ultrasound systems may be simply and advantageously converted to systems that provide beam softening compensation in the manner used by system 300. Specifically, prior art system 100 (shown in FIG. 1) may be converted by adding the beam softening delay modules to delay line 114 and by appropriately adjusting the controller. Those skilled in the art will appreciate that the beam softening delay modules BSoftD:1–BSoftD:N (shown in FIG. 5) need not exist as distinct physical units and that the beam softening delays may be incorporated into the other delays provided by the delay line. Therefore, prior art system 100 may be adapted to advantageously use the present invention by adjusting controller 114 so that it causes delay line 114 to provide the additional beam softening delays.

Although not shown in FIG. 5, those skilled in the art will appreciate that system 300 includes devices for increasing the temporal resolution of the delayed samples applied to summer 116 via lines 314a, and that such devices may be implemented as interpolation circuitry in delay line 314 for interpolating between samples, or alternatively as devices for varying the sampling frequency used by converter array 112. Further, although not shown in FIG. 5, those skilled in the art will appreciate that system 300 also includes devices for implementing some form of time gain control.

Figure 6:
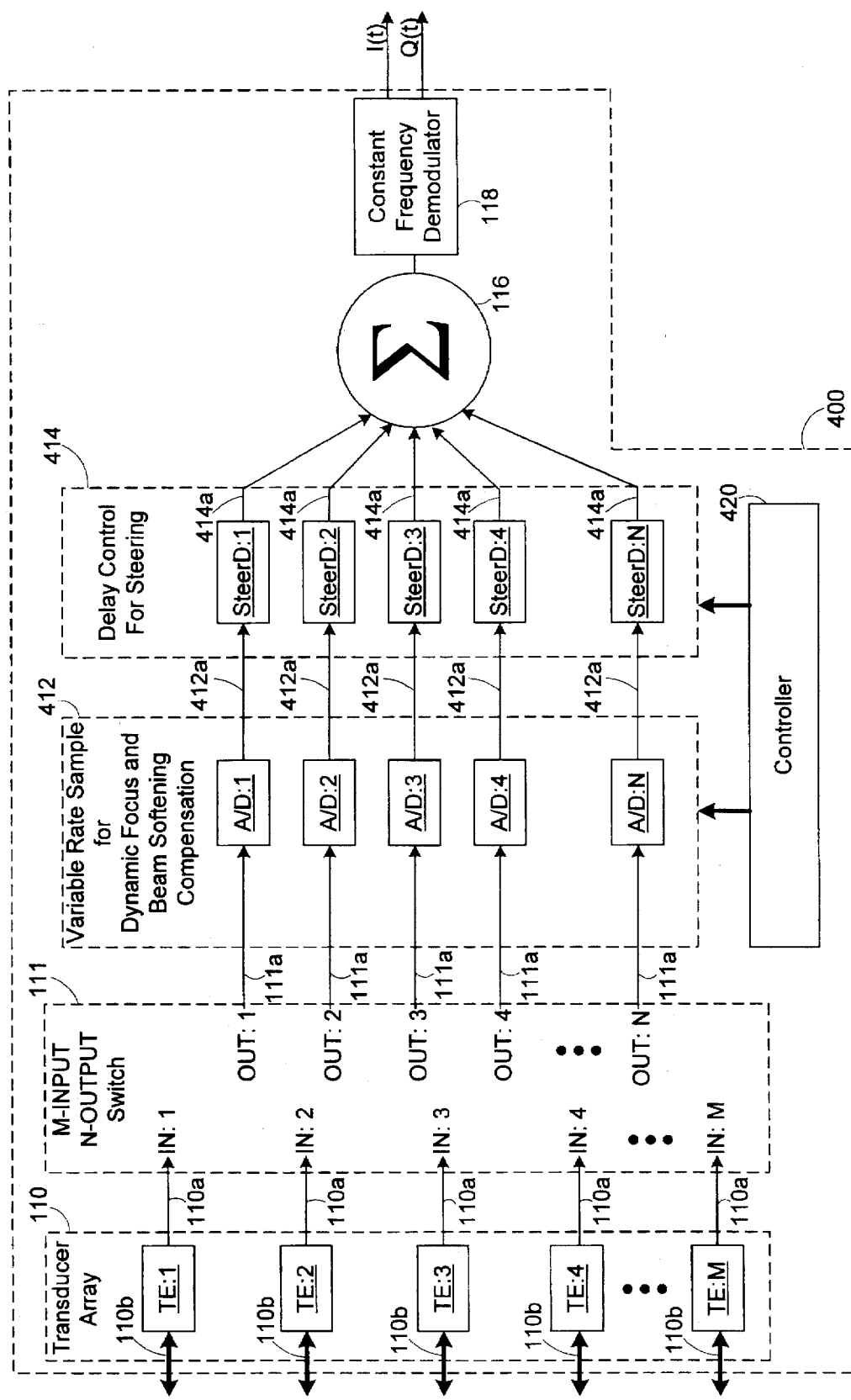
FIG. 6 shows a block diagram of a portion of the signal processing section of another N-channel, phased array, pulsed ultrasound system constructed according to the invention to provide beam softening compensation.

FIG. 6 is a block diagram of a portion of the signal processing section of yet another embodiment of an N-channel, phased array, pulsed ultrasound system 400 constructed according to the invention so as to provide an improved form of ultrasound beam softening compensation. System 400 is similar to system 200 (shown in FIG. 3), however system 400 uses a different analog-to-digital converter array 412, a different delay line 414, and a different controller 420. In system 400, delay line 414 includes only steering delay modules SteerD:1–SteerD:N and controller 420 provides the focussing and beam softening delays by varying the sampling frequency $F_{SV}$ used by analog-to-digital converter array 412. Whereas in system 200 (shown in FIG. 3) the beam softening delays were provided by varying the sampling frequency of the converter array and the focussing delays were provided by the focus delay modules, in system 400 both the beam softening and the focussing delays are provided by varying the sampling frequency of the converter array and only the steering delays are provided by delay line 414. It is generally not practical to provide the steering delays by varying the sampling frequency of the converter array because the steering delays are often much longer than the period of the sampling frequency. Therefore, the steering delays are preferably provided by a delay line as shown in FIG. 6.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A system for processing an ultrasound echo signal received in response to a transmitted ultrasound signal characterized as having an energy distribution with a predetermined center frequency, the ultrasound echo signal being characterized as having a centroid frequency that decreases from the center frequency of the transmitted ultrasound signal as a function of time, the system comprising:

(A) means for receiving the ultrasound echo signal including means for generating an electrical signal representative of the ultrasound echo signal;

(B) sampling means for generating samples of the electrical signal at a sampling frequency;

(C) demodulation means for demodulating the samples of the electrical signal, the demodulation means producing a demodulated signal having an energy distribution in the frequency spectrum substantially centered about a predetermined frequency; and (D) control means for controlling the sampling means so that the sampling frequency decreases as a function of the centroid frequency so that said predetermined frequency remains substantially independent of changes in said centroid frequency.

2. A system according to claim 1, wherein the sampling means includes an analog-to-digital converter for receiving the electrical signal and generating a sequence of digital samples thereof at a converter frequency.

3. A system according to claim 2, wherein the control means controls the analog-to-digital converter so that the converter frequency is equal to the sampling frequency.

4. A system according to claim 2, wherein the converter frequency is constant.

5. A system according to claim 4, wherein the sampling means further includes first variable delay means for delaying the digital samples by a first variable amount of delay so as to generate samples at the sampling frequency.

6. An ultrasound signal processing system for processing an ultrasound signal so as to compensate for beam softening of said ultrasound signal, wherein the ultrasound signal has a centroid frequency that decreases as a function of time, the system comprising:

(A) an array of transducer elements, each transducer element for receiving the ultrasound signal and for generating an electrical signal representative thereof;

(B) a plurality of signal samplers, each of the samplers being coupled to receive a respective one of the electrical signals and for generating a sequence of sample signals at a sampling frequency in response thereto;

(C) control means for controlling the signal samplers so that the sampling frequency of each signal sampler decreases as a function of the centroid frequency;

(D) summing means for generating a summed signal by summing the samples generated by all the samplers in the array; and (E) constant frequency demodulator means for demodulating the summed signal so as to produce a demodulated signal;

wherein the sampling frequency of each signal sampler decreases as a function of the centroid frequency such that the demodulated signal has an energy distribution in the frequency spectrum substantially centered about zero Hertz.

7. A system according to claim 6, wherein each sampler in the array of samplers includes an analog-to-digital converter, each of the analog-to-digital converters being coupled to receive a respective one of the electrical signals and for generating a sequence of digital samples thereof at a converter frequency.

8. A system according to claim 7, wherein the control means controls the analog-to-digital converters so that the converter frequency is equal to the sampling frequency.

9. A system according to claim 7, wherein the converter frequency is constant.

10. A system according to claim 9, wherein each sampler further includes first variable delay means for delaying the digital samples by a first variable amount of delay so as to generate samples at the sampling frequency.

11. A system according to claim 10, wherein each sampler further includes a second variable delay means for delaying the digital samples by a second variable amount of delay so as to provide dynamic focus control.

12. A system according to claim 11, wherein each sampler further includes a first constant delay means for delaying the digital samples by a first constant amount of delay so as to provide steering control.

13. An ultrasound signal processing system for processing an ultrasound signal so as to compensate for ultrasound beam softening, wherein the ultrasound signal has a centroid frequency that decreases as a function of time, the system comprising:

(A) means for receiving the ultrasound signal including means for generating an electrical signal representative of the ultrasound signal;

(B) sampling means for generating samples of the electrical signal at a sampling frequency; and (C) control means for controlling the sampling means so that the sampling frequency varies so as to be substantially equal to a constant value times the centroid frequency.

14. A method of processing a process signal representing an ultrasound signal so to compensate for beam softening of the ultrasound signal, wherein the ultrasound signal has a centroid frequency that decreases as a function of time, the method comprising the step of:

sampling the process signal at a sampling frequency which varies as a function of time and said centroid frequency.

15. A method according to claim 14, wherein the sampling frequency $F_{SV}$ and centroid frequency $F_C$ are related to one another by a constant K.

16. A method according to claim 15, wherein $F_{SV}=KF_C$.

17. A method according to claim 16, wherein $K=F_S/F_0$, wherein $F_S$ is the initial sampling frequency and $F_o$ is the initial center frequency of the ultrasound signal.

18. A system according to claim 1, wherein said predetermined frequency is zero Hertz.

* * * * *